F. W. LARCHER.
DIRIGIBLE LAMP FOR MOTOR VEHICLES.
APPLICATION FILED JULY 16, 1909.

967,529.

Patented Aug. 16, 1910.

Witnesses

Inventor
Frank W. Larcher
By E. E. Vrooman
Attorney

UNITED STATES PATENT OFFICE.

FRANK W. LARCHER, OF OAKLAND, CALIFORNIA, ASSIGNOR TO ALFRED H. LENT, OF OAKLAND, CALIFORNIA.

DIRIGIBLE LAMP FOR MOTOR-VEHICLES.

967,529.   Specification of Letters Patent.   Patented Aug. 16, 1910.

Application filed July 16, 1909. Serial No. 507,996.

*To all whom it may concern:*

Be it known that I, FRANK W. LARCHER, a citizen of the United States, residing at Oakland, in the county of Alameda and State of California, have invented certain new and useful Improvements in Dirigible Lamps for Motor-Vehicles, of which the following is a specification.

This invention relates to headlight operating mechanism and the principal object of the same is to provide a yielding connection between the headlight operating mechanism and the steering gear so that the vibrations of said steering gear incidental to the movement of the vehicle will not be communicated to the headlight operating mechanism.

In carrying out the object of the invention generally stated above, it will, of course, be understood that the essential features thereof are susceptible of changes in details and structural arrangements, but a preferred and practical embodiment of the same is shown in the accompanying drawings, wherein—

Figure 1:
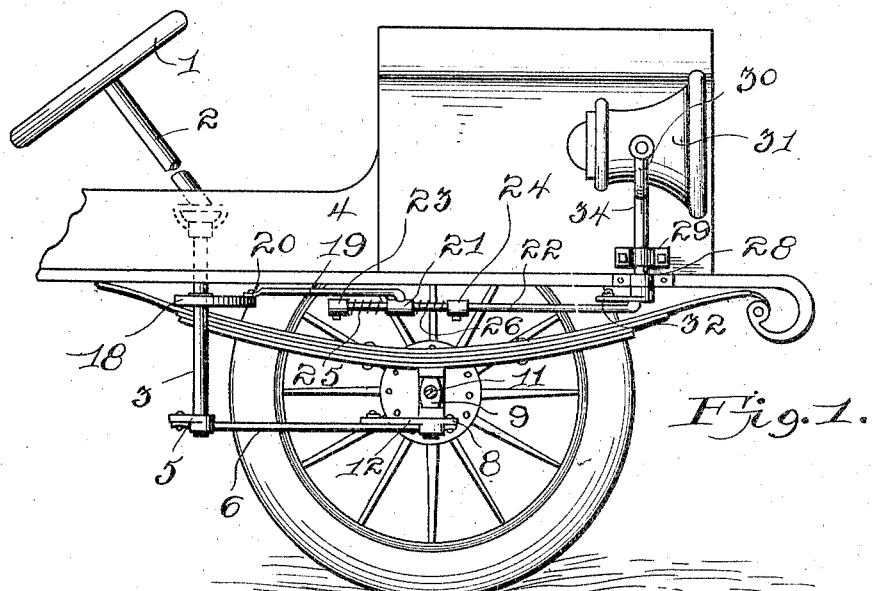
Figure 2:
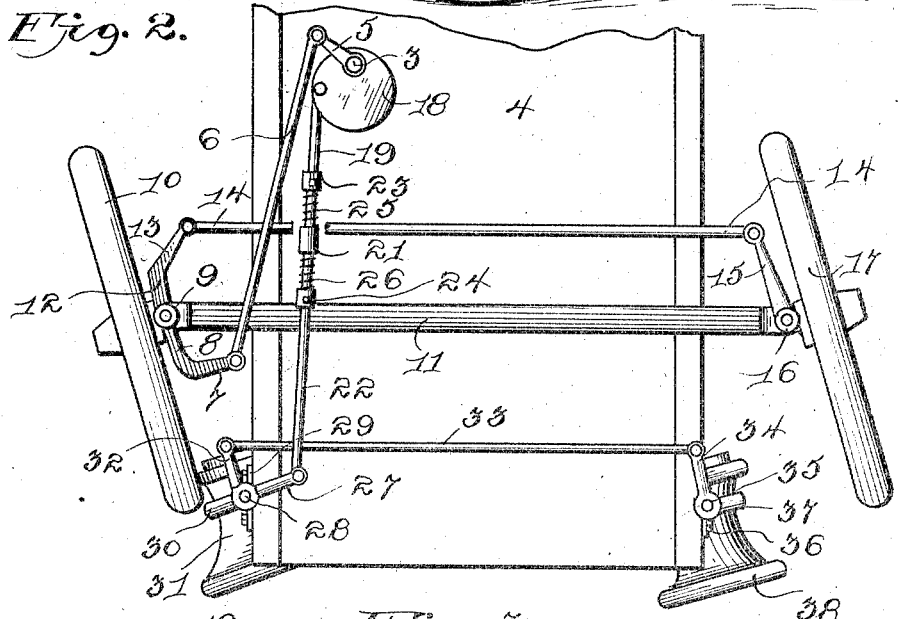
Figure 3:
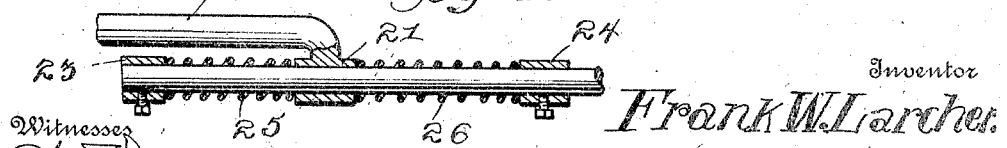

Figure 1 is a view in side elevation of the front portion of a motor vehicle, one of the front wheels thereof being removed to show the improved headlight operating mechanism. Fig. 2 is a bottom plan view of the front portion of a motor vehicle showing the invention applied thereto. Fig. 3 is a detail fragmentary view, partly in section, showing the yielding connection between the headlight operating mechanism and the steering gear.

Referring to the drawings by numerals, 1 designates the steering wheel of a motor vehicle, 2 the shaft therefor which has the usual flexible connection with a vertically arranged shaft 3 that extends through the body 4 of the motor vehicle and at its lower end is provided with a crank arm 5 the free end of which connects with one end of a rod 6. Said rod 6 projects forwardly beneath the body of the vehicle and its front end connects with an angular end 7 of a crank arm 8 projecting forwardly from a knuckle joint 9 that connects one wheel 10 to the axle 11. Said knuckle joint 9 also carries a rearwardly projecting crank arm 12 the angular end 13 of which is connected with one end of a rod 14, extending transversely across the bottom of the vehicle and having its other end connected to a crank arm 15 extending from a knuckle joint 16 which connects the wheel 17 to said axle 11. An eccentric 18 is carried by the shaft 3. A rod 19 extending beneath the bottom of the vehicle has a reduced and flattened rear end 20 fastened to the edge of said eccentric 18, the forward end of said rod being downturned and carrying a sleeve 21 arranged parallel with said rod and slidably mounted on a connecting rod 22. Said rod 22 has two lugs 23—24 adjustably mounted thereon, one in front and the other at the rear of said sleeve 21. Springs 25—26 are coiled about said rod 22, one of said springs being interposed between each lug 23—24 and said sleeve 21. The forward end of said rod 22 is connected to a crank arm 27 projecting from a shaft 28 mounted in a bracket 29 carried by the vehicle body, said shaft 28 carrying a lamp fork 30 for a lamp 31. Said shaft 29 is also provided with another crank arm 32 the outer end of which is connected to one end of a rod 33 extending transversely across the bottom of the vehicle and connecting with a crank arm 34 of a shaft 35 mounted in a bracket 36 and carrying a fork 37 which supports a lamp 38.

It will be seen from the foregoing that through the described mechanism the movement of the steering mechanism is simultaneously communicated to the lamp operating mechanism so that the lamps will always project their rays in the direction of travel of the vehicle. It will also be seen that the described yielding connection between the steering mechanism and the headlight operating mechanism will prevent the vibrations of the steering mechanism being communicated to said headlight operating mechanism, and, further, that by means of the adjustable lugs 23—24, the tension of said yielding connection may be readily regulated.

What I claim as my invention is:—

1. In a motor vehicle, the combination with the steering mechanism thereof, of a rod operated by said mechanism and provided with a sleeve at one end, a rod slidably mounted in said sleeve, adjustable lugs carried by said rod, springs interposed between said lugs and said sleeve, and headlight operating means connected to said rod.

2. In a motor vehicle, the combination with the power shaft to the steering mechanism, of a rod eccentrically connected to and operated by said shaft, a connecting rod having an adjustable yielding connection with said first-mentioned rod, and headlight operating mechanism operated by said connecting rod.

3. In a motor vehicle, the combination with the power shaft of the steering mechanism, of an eccentric carried by said shaft, a rod projecting therefrom, a connecting rod having a yielding connection with said rod, and headlight operating mechanism connected to said connecting rod.

4. In a motor vehicle, the combination with the steering mechanism thereof, a rod projecting from said mechanism, a sleeve carried by one end of said rod, a connecting rod slidably mounted in said sleeve, adjustable lugs mounted on said connecting rod and arranged in front and to the rear of said sleeve, yielding means interposed between said lugs and sleeve, and headlight operating means connected to said connecting rod.

5. A headlight operating device for vehicles comprising a rod, means for eccentrically connecting the same with the power shaft of a steering mechanism, a connecting rod having one end slidably connected to the first mentioned rod, yieldable means opposing the slidable movements of connecting rod, and head-light operating mechanism connected to said connecting rod.

In testimony whereof I affix my signature in presence of two witnesses.

FRANK W. LARCHER.

Witnesses:
E. R. MARRIOTT,
H. C. SCHROEDER.